though not limited to high purity iron ore.
3,368,884
HEAT SOAKING OF IRON ORE TO
PREVENT BOGGING
C. F. Gray and Robert O. Maak, Baton Rouge, La., assignors to Esso Research and Engineering Company, a corporation of Delaware
No Drawing. Filed Dec. 31, 1964, Ser. No. 422,564
6 Claims. (Cl. 75—26)

ABSTRACT OF THE DISCLOSURE

The direct reduction of iron ore in staged fluidized beds is handicapped by bogging, especially at high temperatures in ferrous reduction zones. The tendency toward bogging can be reduced by pretreatment of the ore under controlled conditions at low temperatures until the surfaces of the ore particles are made resistant to bogging.

---

This invention relates to the art of producing sponge iron by direct reduction of iron ore. In particular, it relates to improvements in an iron ore reduction process wherein fluidized oxidic iron ores are reduced and metallized by direct contact with hydrogen, carbon monoxide, and mixtures of these and other gases.

In accordance with certain prior art techniques, sponge iron is produced by reduction of fluidized particulate oxidic iron ores, i.e., ores consisting essentially of oxides of iron, at temperatures below the melting point of the oxides and metallized product. Generally, such processes are operated by providing a series of staged zones, i.e., zones wherein the ore is separated into a series of beds which move downwardly and countercurrently to ascending reduced gases.

The ore is deoxidized, i.e., reduced, as the ore moves downwardly from one bed to the next. Thus, in an upper bed much of the oxidic iron ore, e.g., ferric oxides (hematite) is reduced in a ferric reduction zone to magnetic oxides of iron (magnetite); in a next succeeding bed the magnetic oxides of iron are reduced in a ferrous reduction zone to ferrous oxide (wustite); and finally the ferrous oxide is reduced to substantially metallic iron. In the process, the reducing power of the gas is spent as the gas ascends upwardly from one zone to the next, and as the ore progresses through the stages from, e.g., hematite to magnetite, from magnetite to wustite, and from wustite to metallic iron.

Each of the stages of such processes is generally operated at as high a temperature as feasible because higher temperatures favor faster reduction rates and hence provide greater efficiency. There is a limit, however, above which a fluidized operation is no longer feasible, or even possible, because the beds will become agglomerated or defluidized.

In all such processes it is desired to have sufficiently high temperature to achieve maximum reduction, and to achieve same smoothly, rapidly, and efficiently, supra. One would expect to achieve maximum reduction rate by increasing the temperature of the reaction, for it is known that the reaction proceeds at a faster rate with increasing temperature. However, high temperatures can produce bogging or, if the temperature becomes sufficiently high, sintering of the ore.

The tendency of a fluidized iron ore reduction process to bog also increases with staging. Hence, when a process is staged, the age distribution of the particles within any given bed is narrowed. In a ferrous reduction zone, or zones, the problem can become quite severe. The severity of the problem also increases with reducing gases of increasing hydrogen concentration.

Bogging is a phenomenon manifested by a "stickiness" occurring at the surfaces of the individual solid iron ore particles. The tendency to bog increases with increasing temperature. Prior to a process becoming inoperable because of bogging, it has been observed that the surfaces of the individual ore particles become covered in whole or in part, dependent upon temperature, with crystalline forms of very pure iron. These crystalline forms, microscopic in character, are believed to grow on active sites from within the particles and often take on the appearance of nodules or "whiskers" extending outwardly from the individual particles. These nodules thus project outwardly and create sites or locations whereupon the individual particles tend to attach one to another upon contact, the nodules forming small "micro" welds. This joining together of the individual particles forms aggregates or agglomerates. This phenomenon, particularly acute in specular hematite ores, militates against proper fluidization of the particles and hence bogging, or loss of fluidization, of the bed occurs. In effect, bogging is not too unlike sintering, but differs therefrom inasmuch as sintering requires higher temperature and greater surface reduction so that the surfaces of the particles weld together over a wide area to form bonds of greater mechanical strength. In any event, however, bogging greatly reduces gas utilization and over-all process efficiency. It even can prevent the operation of a fluidized process.

Bogging is a very troublesome phenomenon and presents a dilemma for, on the one hand, the higher the temperature is raised to obtain better reaction rates, the more acute the tendency toward bogging. On the other hand, the more the temperature is lowered to prevent bogging the less the efficiency of the process. With certain ores, e.g., Carol Lake ores, the tendency to bog at elevated temperature is especially severe, and for this reason it is impractical to treat some ores in a fluidized iron ore reduction process.

The present invention has for its primary object a solution to the problem of bogging. In particular, its objective is to provide the art with a simplified, new and novel fluidized iron ore reduction process wherein the tendency toward bogging is inhibited and, in some cases, completely eliminated, so that more elevated temperatures can be used in the over-all reduction to achieve better efficiencies and operation over longer periods. A further object is to provide a process combination wherein the tendency toward bogging is inhibited in the several stages of a fluidized iron ore reduction process, especially in the ferrous reduction stage. An even more specific object relates to such process combination wherein a significant portion of hydrogen is used as the reducing gas.

These and other objects are achieved in accordance with the present invention which contemplates preheating a particulate oxidic iron ore in a reducing atmosphere in a pretreat reduction step while providing a preselected temperature-time relationship sufficient to reduce the surfaces of the ore particles to substantially metallic iron, to severly crack, fracture, and to substantially eliminate the surface crystallinity of the particles. The present invention thus contemplates a pretreating step which produces marked differences in the particle structure of the ores as a function of the pretreatment. Following such pretreatment, the reduction of the particles is then continued at a more elevated temperature.

In a specific and preferred embodiment, particulate iron ore solids particles are fluidized and contacted in a pretreating step with reducing gases at temperatures ranging from about 900° F. to about 1040° F. for a preselected time sufficient to substantially completely reduce the surfaces of the iron ore solids particles to metallic iron, to substantially lessen the crystallinity of the metallic iron surface and to produce severe cracking and fracturing of the iron ore solids particles. Such pretreatment generally requires no more than from about 2 to about 6 hours. The lower temperatures require longer residence or holdup times and the higher temperatures lesser residence times. With most ores, however, it is found that no more than about 4 hours is required to completely change the characteristics of the particles and generally this can be achieved within from about 2½ to about 4 hours. While temperatures lower than 900° F. can be used where greater residence times are provided, the effectiveness of the treatment is lessened and the time required for the treatment is inordinately long.

Surprisingly, it has been discovered that by the use of a pretreatment requiring these critical preselected temperature-time relationships, the surface of the particles, e.g., hematite, can be reduced to a substantially noncrystalline form of metallic iron, or form of iron having little crystallinity, and under conditions wherein the particles are severely fractured and cracked. Pursuant to such pretreatment, however, the interior or center of the iron ore particles remain in the oxidized state. Following such pretreatment, the ore can then be subjected to a more rigorous heat treatment and reduced without the occurrence of bogging. Thus, an ore subjected to such pretreatment can be reduced at a more elevated temperature than would otherwise have been possible without the occurrence of bogging. The reasons for this are not fully understood.

It is believed, however, that in such pretreatment the whiskers or crystalline growths, which normally form upon the iron ore solids particles during reduction, are virtually destroyed, or do not form. Thus, in the pretreatment the surfaces of the particles are reduced and the surface oxides converted to substantially metallic iron, but the iron possesses little crystallinity and there is little or no occurrence of the expected nodular growths. It is believed that the surface iron is formed through a different mechanism. Thus, it is believed that the iron is formed from the surface oxides which are reduced without going through the wustite state, i.e., hematite and magnetite are reduced directly to metallic iron without forming wustite.

Further, the individual iron ore solids particles during the pretreatment split and tear from the surfaces inwardly but are held together by nuclei of unreduced solids. Flat edges on the particles disappear or are reduced in number. The shape of the particles becomes more irregular. These effects, among other things, are believed to decrease the number of potential sites within the particles from which crystalline deposits might grow and extend outwardly. Hence, the splitting and tearing and the formation of irregular surfaces on the individual particles also contribute to the elimination of bogging, and generally the more severe the cracking, the greater the resistance to bogging.

A feature of the invention, however, is that the ore particles, though partially torn and split, do not generally break completely apart and thus cause substantial undesirable decrepitation, i.e., a tearing apart of the particles to produce finer particles or fines. Decrepitation is thus largely avoided and the treatment of the ore at relatively moderate temperatures with reducing gases at sufficiently prolonged conditions avoids the normal shock which would be incurred by a rapid and rigorous temperature elevation applied to the ore.

In accordance with the more preferred practice of this invention, a reducing gas containing hydrogen is employed. Suitably, such gas should range from about 40 percent hydrogen to 100 percent or pure hydrogen. Carbon monoxide is also suitable in such mixtures, but preferably not more than about 60 percent thereof should be present because above this concentration carbon formation can become excessive. The use of hydrogen, or gases containing substantial quantities of hydrogen, is not only advantageous but quite unexpected for it is known that increasing concentrations of hydrogen increases the tendency of an ore to bog.

In the best mode of practicing the present invention, the iron ore solids are treated in a series of fluidized reaction zones. A preheat reduction zone is provided, and oxidic iron ores are treated at temperatures ranging preferably from about 900° F. to about 1040° F. to substantially completely reduce the surface of the individual particles to metallic iron. The metallic iron surface, crust, or coating formed on the particles retards the bogging tendency in subsequent more rigorous reduction. In a subsequent stage, or stages, the iron ore solids particles (the interiors) are further reduced at elevated temperatures, ranging from about 1200° F. to about 1800° F., and preferably from about 1300° F. to about 1500° F., to provide a sponge iron product ranging from about 70 to about 95 percent, and higher, metallization. An especially useful process is one wherein is employed a pretreating stage which is preceded by a ferric reduction stage and succeeded by two ferrous reduction stages. In the first of the ferric reduction stages, partially spent reducing gas is burned to provide heat for reduction of ferric oxides to magnetic oxides of iron, and for the subsequent reductions. Temperatures ranging from about 1300° F. to about 1600° F. are preferably provided within the first ferric or "burning" zone. The preheat reduction zone, operated at about 900° F. to about 1040° F., is also a ferric reduction zone in that the magnetic iron oxide at the surface of the particle is reduced to metallic iron and the interior of the particle to ferrous oxide. The iron ore solids particles are subsequently reduced at temperatures ranging from about 1300° F. to about 1500° F. in ferrous reduction zones. Mixtures of carbon monoxide and hydrogen are generally suitable for the reduction, and preferably the hydrogen concentration ranges from 40 percent to about 60 percent or more hydrogen.

The following nonlimiting examples and pertinent demonstrations bring out the more salient features and provide a better understanding of the invention.

A large quantity of a specular oxidic iron ore, i.e., a raw Carol Lake ore, consisting essentially of 55 percent hematite and 45 percent magnetite, is pulverized in an impact mill, and divided into several like portions. This ore is one well known as possessing a severe tendency to bog upon reduction.

*Example 1*

A portion of the ore is continuously charged into a fluidized iron ore reactor or reduction process providing a series of four staged fluidized zones, a first ferric reduction zone, a second pretreating zone, and two subsequent ferrous reduction zones. The ore is fluidized by an upwardly flowing gas initially sixty percent hydrogen and forty percent nitrogen. The gas flows from a zone containing an iron ore at a lower level of oxidation to a zone containing an ore at the next higher level of oxidation, i.e., from the bottom to the top of the reactor. In the first ferric zone, the partially oxidized gas is burned with air with low reducing power gas to provide heat for the succeeding reduction stages. The reduced ore moves from the top to the bottom of the reactor and from one stage of reduction to the next. The first ferric reduction stage, wherein ferric oxides are reduced essentially to magnetic oxide of iron, is operated at 1300° F. The pretreating stage is operated at 1040° F., and a residence time of four hours is provided. Temperatures of 1300° F. are also employed in the following stages wherein at least the interiors of the solids particles are converted from magnetic oxides of iron to ferrous oxide and, in the final stage, wherein the ferrous oxide is reduced to provide 94 percent metallization. Bogging does not occur.

In sharp contrast, attempts to operate at such conditions without the pretreat stage results in signs of bogging within the ferrous reduction beds within about ten minutes from start-up and the ferrous reduction beds become severely and totally bogged in only about twenty minutes of continuous operation.

Examples 2–4

Other portions of the ore were fluidized and pretreated with reducing gases at concentrations consisting essentially of forty percent hydrogen and sixty percent nitrogen (40:60 $H_2/N_2$) and with gases sixty percent hydrogen and forty percent nitrogen (60–40 $H_2/N_2$), and at selected temperatures and pretreatment times. These results were as shown by the Examples (Runs 1, 3 and 5) and Demonstrations (Runs 2 and 4) in the table immediately below. Following such pretreatments in Runs 1–5, the reduction of the portions of ore was also completed by contacting these pretreated ores with a 60:40 hydrogen-to-nitrogen gaseous mixture at 1400° F. in a single reduction stage. Another demonstration, i.e. Run 6, shows the results obtained where there was no pretreatment of the ore, but only a reduction step utilizing a 60:40 $H_2/N_2$ gas mixture at 1400° F.

| Run | Pretreat Temperature, °F. | Pretreatment Time (Hours) | Pretreatment Gas Composition, $H^2/N^2$ | Time Required (Mins.) to Bog in Subsequent Reduction at 1,400° F. |
|---|---|---|---|---|
| 1 | 1,000 | 3 | 40:60 | 81 |
| 2 | 1,100 | 2 | 40:60 | 25 |
| 3 | 1,000 | 2 | 60:40 | 77 |
| 4 | 1,100 | 3 | 60:40 | 60 |
| 5 | 1,000 | 3 | 60:40 | 255 |
| 6 | None | None | None | 11 |

Analysis of the pretreated ores showed that pretreatment at even 1100° F. has little effect on the structure of the ore particles. Pretreatment at 1000° F., however, results in severe cracking and fracturing of the particles though there is apparently little or no substantial decrepitation. There are no visible nodules or whiskers on the particles pretreated at the lower temperature, and the iron crust evidences considerably less crystallinity than the particles treated at the higher temperature.

In the pretreated ore portions of Runs 1–5 above it was observed that the most effective run (Run 5) evidences less crystallinity, greater particle surface fracturing and less nodular growths than any of the material pretreated at the lower temperatures, though the ore from both Runs 1 and 3 do display marked changes from their original surface characteristics. Conversely, the ores treated at the higher temperature (Runs 2 and 4) showed no evidence of crystallinity or fracturing. Moreover, nodular growths were apparent upon the surfaces of the particles. The performance upon subsequent reduction of ore portions pretreated at 1000° F. are superior in all instances to those pretreated at 1100° F.

In the subsequent reduction, as will be observed, the time required to the point of bogging was increased with the effectiveness of the pretreatment. Thus, it will be observed that the pretreated ores of Runs 2 and 4, when subsequently reduced, were less resistant to bogging than any of the runs at the lower temperature. Optimum benefits in these specific runs, however, are obtained in accordance with Run 5 wherein the ore was pretreated at low temperature with higher hydrogen concentration for a slightly longer time than in Example 1. Thus, a time of 255 minutes was required to cause bogging in Run 5 whereas only 81 minutes were required in Run 1. With higher hydrogen concentration, Run 3 compares more favorably with Run 1 even though residence time was less. These examples and demonstrations then show the importance of preselecting the desirable set of conditions depending not only upon a time-temperature relationship, but also upon hydrogen gas concentration.

The following example further demonstrates the criticality of providing a time-temperature relationship to condition the surface of the ore solids particles.

Examples 5–7

Portions of the ore were preheat treated at about 1020° F. (Runs 7–9) with a 60:40 ratio of hydrogen-to-nitrogen for a time ranging from 2–3 hours as shown in the table which follows: Upon subsequent reduction with the same gaseous mixture at 1400° F. for an extended period, the following results were obtained:

| Run No. | Preheat Temp.,° F. | Pretreatment Time (Hrs.) | Result of Subsequent Reduction at 1,400° F. |
|---|---|---|---|
| 7 | 1,020 | 2 | Completely bogged after 105 minutes. |
| 8 | 1,020 | 2½ | Partially agglomerated after 150 minutes. |
| 9 | 1,015 | 3 | Completely fluid at end of 195 minutes (did not bog). |

In contrast, when the ore is pretreated at 1100° F., even for 4½ hours with the gaseous mixture, and then subsequently reduced as in Runs 7–9, the fluidized pretreated ore becomes completely bogged within only 45 minutes.

From these data it is apparent that preheat treating at 1020° F. in a reducing atmosphere for a period of 3 hours is sufficient to prevent bogging at 1400° F. It is also apparent that pretreatment at only a slightly higher temperature—viz., 1100° F.—is entirely inadequate. The difference stems from the physical differences in the surface characteristics produced by pretreatment at the lower temperature.

Analysis of the pretreated ores of Runs 7–9 thus shows that as the pretreating time is increased, surface crystallinity is reduced, the tearing and fracturing of the particles increases, and the formation of nodules is lessened; or that the nodules do not form. In contrast, however, treatment at the higher temperatures does not sufficiently reduce crystallinity, does not cause the desired type of fracturing of the particles, and does not significantly reduce the formation of nodules. Subsequent reduction of the ore pretreated at 1100° F. for 4½ hours with the gaseous mixtures, therefore, does not significantly lessen the tendency to bog.

It is apparent that the present process is subject to some variation and modification without departing from the spirit and scope of the invention.

In accordance with this invention it is found that a preheat treatment in a reducing atmosphere at preselected times with temperatures ranging up to about 1040° F. decreases the tendency of the fluid bed to bog upon subsequent reduction. The preheat treatment, carried out for a sufficient interval of time, conditions the surface character of the particles so that subsequent reduction is possible without the occurrence of severe bogging. Moreover, hydrogen, especially an increasing amount of hydrogen, in the gaseous mixture used for pretreatment further aids in decreasing the tendency of the pretreated ore to bog. The tendency of the pretreated ore to resist bogging is directly related to the absence or lessening of the presence of nodules, a decreasing surface crystallinity of the iron, and the severity of the cracking of the particles during pretreatment. In general, the more severe the cracking the greater the resistance to bogging.

Having described the invention, what is claimed is:

1. In a process for the production of iron from oxidic iron ore wherein the iron ore in particulate form is fluidized within a bed by a stream of gas and reduced at elevated temperatures, the improvement comprising preheat treating the ore in a reducing gas atmosphere for preselected periods ranging from about 2 to about 6 hours at temperatures ranging up to about 1040° F. sufficient to substantially reduce the surfaces of the iron ore particles to metallic iron, to substantially lessen the crystallinity of the metallic iron surfaces, to produce severe cracking and fracturing of the iron ore particles, whereby the resistance of the ore to bogging is substantially improved, and further reducing the ore in a fluidized bed ferrous reduction zone at higher temperatures.

2. The process of claim 1 wherein the iron ore is treated at temperatures ranging from about 900° F. to about 1040° F.

3. The process of claim 1 wherein the reducing gas contains at least about forty percent hydrogen.

4. In a staged process for the production of iron by direct reduction of particulate oxidic iron ores, the combination of steps comprising contacting a countercurrently moving ore with ascending reducing gases, fluidizing and reducing same in a series of zones, burning the reducing gas in a first ferric reduction zone at temperatures ranging from about 1200° F. to about 1800° F. to partially reduce the ore and to provide heat to the process, preheat treating the ore in a subsequent zone in a reducing gas atmosphere for preselected periods ranging from about 2 to about 6 hours at temperatures ranging up to about 1040° F. sufficient to substantially reduce the surfaces of the iron ore particles to metallic iron, to substantially lessen the crystallinity of the metallic iron surfaces and to produce severe cracking and fracturing of the iron ore particles, then further reducing the surface metallized iron ore particles in a ferrous reduction zone operated at temperatures ranging from about 1300° F. to about 1500° F. to produce a product of at least about 70% metallization.

5. In a process for the production of iron by direct reduction of particulate oxidic iron ores, the combination of steps comprising fluidizing and preheat treating the ore in a reducing gas atmosphere for preselected periods at temperatures ranging from about 900° F. to about 1040° F. for a period ranging from about 2 to about 6 hours sufficient to substantially reduce the surfaces of the iron ore particles to metallic iron, to substantially lessen the crystallinity of the metallic iron surfaces and to produce severe cracking and fracturing of the iron ore particles, then heating, fluidizing, contacting, and further reducing the metallic surfaced iron ore particles with upwardly flowing reducing gases containing at least about 40 percent hydrogen in a plurality of staged fluidized reduction zones, including a plurality of ferrous reduction zones operated at from about 1300° F. to about 1500° F.

6. The process of claim 5 wherein the reducing gas consists essentially of a mixture of at least about forty percent hydrogen and the balance of the mixture is primarily carbon monoxide.

References Cited
UNITED STATES PATENTS

| | | | |
|---|---|---|---|
| 3,020,149 | 2/1962 | Old et al. | 75—26 |
| 2,780,537 | 2/1957 | Stelling et al. | 75—33 X |
| 2,996,373 | 8/1961 | Agarwal | 75—34 X |
| 3,135,598 | 6/1964 | Mizushima | 75—26 |
| 3,199,974 | 8/1965 | Johnson | 75—26 X |
| 3,246,978 | 4/1966 | Porter et al. | 75—34 X |

OTHER REFERENCES

AIMME Transactions, Iron and Steel Div.; 1946, vol. 167, article by Specht et al., pages 240, 257–262, 270, 277–280.

DAVID L. RECK, *Primary Examiner.*

H. W. TARRING, *Assistant Examiner.*